May 30, 1950 H. HACKLANDER 2,509,595
ELECTRONIC BONDING MACHINE
Filed Aug. 2, 1946 2 Sheets-Sheet 2

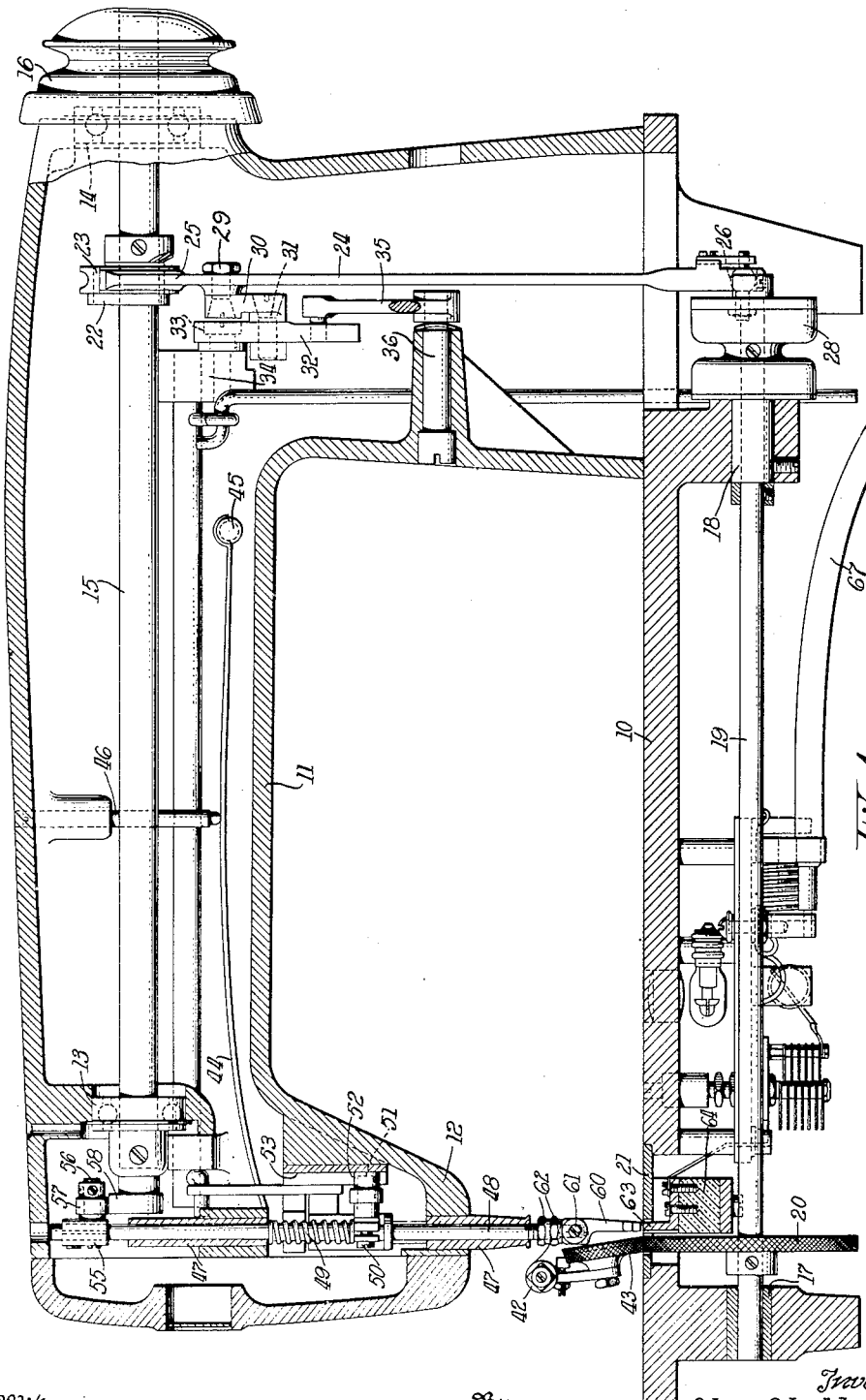

Inventor
Hans Hacklander

Witness.
N. Leszczak

By William P. Stewart
Attorney

Patented May 30, 1950

2,509,595

UNITED STATES PATENT OFFICE 2,509,595

ELECTRONIC BONDING MACHINE

Hans Hacklander, Linden, N. J., assignor to The Singer Manufacturing Company, Elizabeth, N. J., a corporation of New Jersey Application August 2, 1946, Serial No. 688,151

3 Claims. (Cl. 219—47)

This invention relates to machines for bonding together a plurality of plies of thermoplastic sheet material by the use of high frequency electric current.

In machines of this type having a reciprocatory electrode which moves towards and away from a second electrode, it has been found that when the minimum distance between the electrodes is not predetermined, a smooth welded seam of constant thickness is not obtainable. This difference in the thickness of the seam is probably due to variation of the dielectric properties of the material and also variations in the thickness of the material being bonded, that is, on some portions of the seam the material may become plastic quite readily with the result that the spring urged electrode will sink deeper into the plies of material than at another portion of the seam. One of the objects of this invention is to overcome this difficulty by providing means for limiting the approaching movement of the electrodes and in which the means is so arranged and constructed that an accurate adjustment of a thousandth of an inch may be obtained.

A further object of this invention is to provide means for adjustably securing the reciprocatory electrode relative to its actuating means so that the period of time the electrode is in engagement with the work for each cycle of operation may readily be varied.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings:

Fig. 1 is a vertical section taken through the center of a machine embodying my invention.

Figures 2, 3:
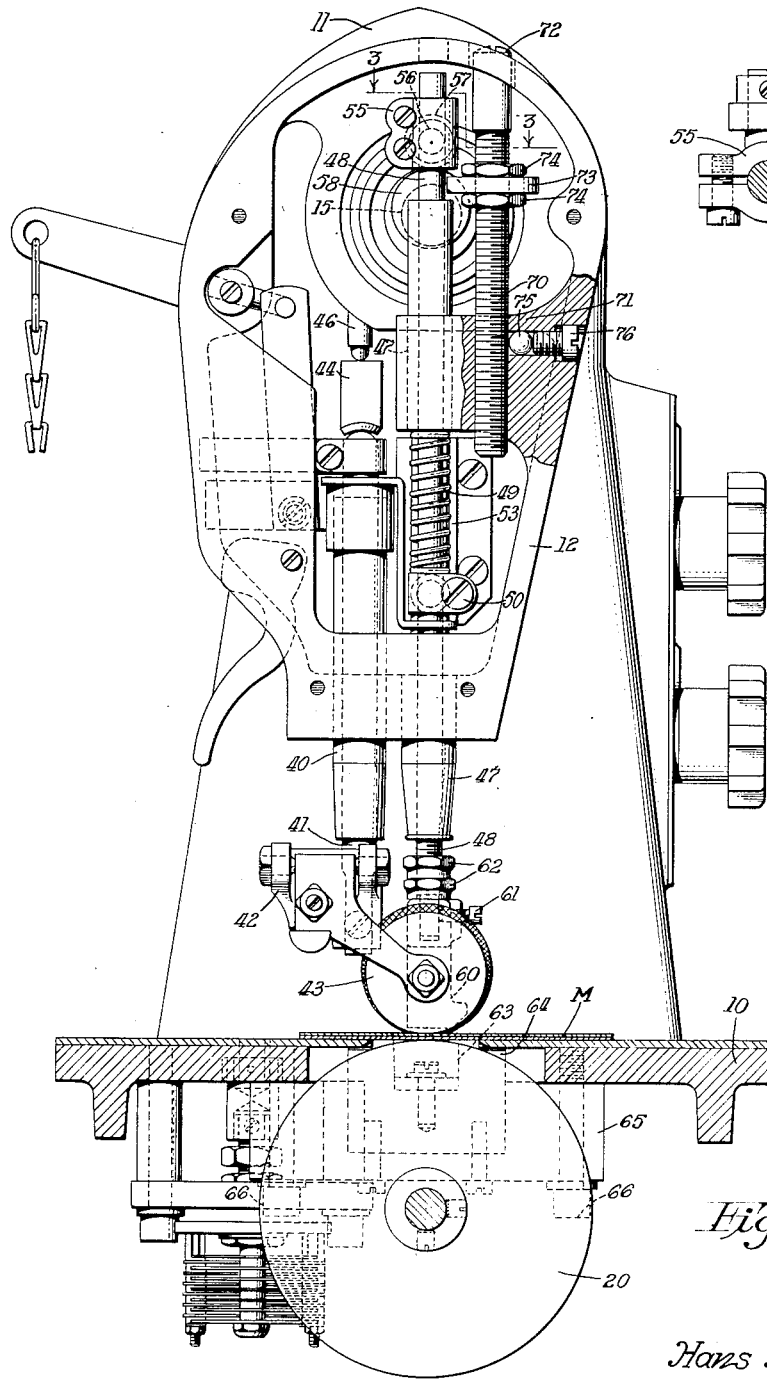
Fig. 2 is a left end elevation, partly in section, of the machine with the face-plate removed to expose the operating parts within the hollow head.
Fig. 3 is a horizontal detailed section taken along the line 3—3 of Fig. 2.

In the embodiment of this invention selected for illustration, my improved bonding machine has a frame comprising a bed 10 carrying an overhanging bracket-arm 11 terminating in a hollow head 12. Journaled in bearings 13 and 14 in the bracket-arm 11 is a main shaft 15 having a combined pulley and hand wheel 16 secured to its outboard end. The pulley 16 may be connected to any suitable source of power for the purpose of rotating the shaft 15. Journaled beneath the bed 10 in the bearings 17 and 18 is a second shaft 19 arranged parallel to the main shaft 15; and secured to the shaft 19 intermediate its bearings is a feed wheel 20, the periphery of which extends through a suitable slot in a plate 21 carried by the bed 10.

The rotary shaft 15 imparts an intermittent step-by-step rotary movement to the shaft 19 through a mechanism comprising an eccentric 22 secured upon the main shaft 15, a block 23 surrounding the eccentric, and a connecting rod 24 having its forked upper end 25 engaging the sides of the block 23 and its lower end pivotally connected at 26 to an arm of a one-way clutch 28 which is secured to the outboard end of the shaft 19.

Adjacent ts upper end, the connecting rod 24 has pivotally secured to it, at 29, one end of an anchor link 30, the other end of which is pivotally connected at 31 to a normally stationary crank arm 32 fulcrumed on a shouldered screw 33 which is threaded into a bearing boss 34 formed on the bracket-arm 11. The arm 32 may be shifted about its pivot 33 by means of a bell-crank lever 35 pivotally secured at 36 to the bracket-arm 11. This mechanism for imparting a step-by-step motion to the feed wheel 20 is fully described in the patent to Hans Hacklander, No. 2,432,412, dated December 9, 1947, for a Bonding machine, to which reference may be had for a more complete and detailed description of the feeding mechanism.

Journaled in a bearing 40 carried by the hollow head 12 is a vertically disposed bar 41 (Fig. 2) having secured to its lower end a bracket 42 which rotatably carries an upper feed wheel 43. The upper feed wheel 43 is inclined at an angle to the vertical and its periphery is adapted to overlie and cooperate with the lower feed wheel 20 to advance the material M. The bar 41 is constantly urged downwardly by a flat spring 44, the ends of which bear upon the top of the bar 41 and stud 45. An adjusting screw 46 is located intermediate the ends of the spring for the purpose of varying the tension. This spring 44, through the bar 41, functions to urge the top feed wheel 43 into yielding engagement with the lower feed wheel 20 to grip the material therebetween. From the above description it will be understood that the feed wheels 20 and 43 impart a step-by-step motion to the material M.

The hollow head 12 is provided with vertically aligned bearings 47 in which an endwise reciprocatory electrode carrying bar 48 is journaled. The bar 48 is urged downwardly by a coil compression spring 49 which encircles the bar 48 and reacts between the upper bearing 47 and a split collar 50 adjustably clamped to the bar 48. The split collar 50 carries a laterally extending pin 51 having on its free end a roller 52 which is located in a guideway 53 (Fig. 1) formed in the hollow head of the machine. This construction prevents the bar 48 from turning in its bearings. Clamped to the bar 48 is a split collar 55 (Figs. 2 and 3) carrying a laterally extending pin 56 having a roller 57 journaled thereon. The roller 57 is located above and cooperates with an eccentric 58 fixed on the free end of the main shaft 15. From the above, it will be understood that when the shaft 15 is rotated the eccentric 58 will engage the roller 57 and raise the bar 48 against the action of the spring 49 through a part of each revolution of the shaft, and will then move away from the roller and permit the spring 49 to force the bar 48 downwardly during the remaining portion of the revolution of the eccentric.

The bar 48 carries at its lower end an electrode 60, the electrode being adjustably secured to the bar 48 by means of a set screw 61 and the lock nuts 62. The upper electrode 60 cooperates with a lower electrode 63 located below the bed 10 of the machine. The electrode 63 is L-shaped in cross section and is secured upon a block of insulating material 64 carried by a U-shaped strap 65 fixed to the underside of the bed 10 by the screws 66.

From the foregoing it will be understood that the feed rollers impart a movement to the material and then bring it to rest and that the electrode 60 is moved in timed relation with the feeding mechanism and engages the material while it is at rest for the purpose of creating a bond between the plies. It will also be understood that a high frequency current is supplied to the electrodes through the coaxial cable 67 so as to create a high frequency field therebetween. The electrical connections between the source of high frequency current and the electrodes is fully shown and described in my above mentioned copending application to which reference may be had for a detailed description.

In order to limit the downward movement of the spring depressed upper electrode 60, for the purpose of adjusting the minimum distance between the electrodes 60 and 63, I have provided a screw 70 which is threaded into a boss 71 formed in the head 12. The upper end 72 of the screw 70 is formed with a screw-driver slot and extends through a suitable opening in the upper part of the head so as to be readily accessible. The screw 70 carries a washer 73 adjustably held in position on the screw 70 by the nuts 74 disposed on opposite sides of the washer. From the above it will be understood that the washer 73 may be adjusted relative to the screw 70 and the screw 70 may be adjusted relative to the head 12.

As shown in Figs. 2 and 3, the peripheral marginal edge of the washer 73 is arranged to underlie the lower end of the split collar 55 fixed on the bar 48 and the position of the washer 73 determines the lowest position to which the spring depressed electrode 60 may descend. It will be obvious that by turning the screw 70 the desired minimum distance between the electrodes 60 and 63 may be adjusted and the thickness of the bond may thus accurately be predetermined. In order to lock the screw 70 in its adjusted position the lug 71 is formed with a bore in which is located a lead pellet 75 adapted to be jammed by the screw 76 against the threads of the screw 70.

From the foregoing description, it will be understood that the eccentric 58 has a fixed throw and that for any complete cycle of operation of the eccentric the portion of the cycle in which the electrode is in contact with the material can be predetermined by adjustment of the electrode 60 longitudinally of the electrode carrying bar 48, and also the lost-motion of the bar 48 can be predetermined by the position of the stop washer 73, and that these two positions are interdependent and by proper adjustment both the thickness of the bond and the length of time the electrode remains in contact with the material can be predetermined.

Having thus set forth the nature of the invention, what I claim herein is:

1. In a machine for bonding together a plurality of plies of thermoplastic material by the use of high frequency current, the combination of feeding mechanism for advancing the material, a fixed electrode, a bar spring urged towards said fixed electrode, means for raising said bar once for each cycle of operation of the machine, an upper electrode carried by said bar, adjustable means for predetermining the downward limit of movement of said bar, said last named means including a readily accessible screw having a circular member extending therefrom and underlying a collar carried by said bar, and means for adjusting the position of the upper electrode relative to said bar for varying the portion of the cycle in which the electrode is in engagement with the material.

2. A machine for bonding together a plurality of plies of thermoplastic material by the use of high frequency current comprising, a frame including a bed and an overhanging bracket-arm, means for imparting an intermittent step-by-step movement to the material to be acted upon, a lower electrode below said bed, an upper electrode above said bed and adapted to cooperate with said lower electrode, mechanism operating in timed relation with the feeding mechanism for moving said upper electrode towards and from said lower electrode, means for adjusting the extent of movement imparted to the upper electrode to thereby vary the portion of the cycle in which the electrode is in engagement with the material, and readily accessible adjustable stop means for predetermining the closest approach the upper electrode will make towards the lower electrode.

3. A machine for bonding together a plurality of plies of thermoplastic material by the use of high frequency current comprising, a frame including a bed and an overhanging bracket-arm, means for imparting an intermittent step-by-step movement to the material to be acted upon, a lower electrode below said bed, an upper electrode above said bed and adapted to cooperate with said lower electrode, mechanism including an eccentric operating in timed relation with the feeding mechanism for moving said upper electrode towards and from said lower electrode, adjustable stop means for predetermining the lowest point to which the upper electrode may descend, and means for adjusting said upper electrode relative to said eccentric for varying the portion of the cycle in which the electrode is in engagement with the material.

HANS HACKLANDER.

REFERENCES CITED

The following references are of record in the file of this patent:

UNITED STATES PATENTS

| Number | Name | Date |
|---|---|---|
| 17,366 | Ellithorp | May 26, 1857 |
| 914,091 | Webster | Mar. 2, 1909 |
| 1,111,829 | Grieb | Sept. 29, 1914 |
| 2,049,292 | Feldmann | July 28, 1936 |
| 2,322,298 | Johnston | June 22, 1943 |
| 2,325,643 | Weis | Aug. 3, 1943 |
| 2,390,288 | Ballamy | Dec. 4, 1945 |
| 2,432,412 | Hacklander | Dec. 9, 1947 |
| 2,434,325 | Vesconte | Jan. 13, 1948 |
| 2,442,451 | Albin | June 1, 1948 |
| 2,453,185 | Bilhuber | Nov. 9, 1948 |
| 2,458,059 | Christensen et al. | Jan. 4, 1949 |

OTHER REFERENCES

Hoyler; An Electronic "Sewing Machine," reprint from August 1943 issue of Electronics by RCA of Princeton, New Jersey.